US009626932B2

(12) United States Patent
Kato

(10) Patent No.: US 9,626,932 B2
(45) Date of Patent: Apr. 18, 2017

(54) IMAGE PROCESSING APPARATUS, IMAGE PROCESSING METHOD AND RECORDING MEDIUM RECORDING PROGRAM FOR CORRECTING IMAGE IN PREDETERMINED AREA

(71) Applicant: CASIO COMPUTER CO., LTD., Shibuya-ku, Tokyo (JP)

(72) Inventor: Yoshiyuki Kato, Hamura (JP)

(73) Assignee: CASIO COMPUTER CO., LTD, Tokyo (JP)

(*) Notice: Subject to any disclaimer, the term of this patent is extended or adjusted under 35 U.S.C. 154(b) by 0 days.

(21) Appl. No.: 15/016,455

(22) Filed: Feb. 5, 2016

(65) Prior Publication Data
US 2016/0284063 A1 Sep. 29, 2016

(30) Foreign Application Priority Data

Mar. 27, 2015 (JP) ................................ 2015-066194

(51) Int. Cl.
G06K 9/40 (2006.01)
G09G 5/00 (2006.01)
H04N 5/93 (2006.01)
G06F 3/00 (2006.01)
G09G 5/34 (2006.01)
G09G 5/373 (2006.01)

(52) U.S. Cl.
CPC ................ G09G 5/00 (2013.01); G06F 3/00 (2013.01); G09G 5/34 (2013.01); G09G 5/373 (2013.01); H04N 5/93 (2013.01); G09G 2340/04 (2013.01)

(58) Field of Classification Search
CPC ......... G06T 5/007; G06T 5/008; G06T 5/009; G06T 2207/20208; H04N 1/407; H04N 1/4072; H04N 1/4074; H04N 1/4076; H04N 1/4078; H04N 5/2176; H04N 5/2355
See application file for complete search history.

(56) References Cited

U.S. PATENT DOCUMENTS

2010/0199214 A1* 8/2010 Mikawa ................ G06F 3/0481
715/800

FOREIGN PATENT DOCUMENTS

JP 2011-015280 1/2011

* cited by examiner

Primary Examiner — Duy M Dang
(74) Attorney, Agent, or Firm — Amin, Turocy & Watson LLP

(57) ABSTRACT

According to an embodiment of the present invention, an image processing apparatus includes a processor, and a computer-readable medium in which a computer program product is stored. The computer program product causes the processor to perform operations to acquire an image, set an area in the image, change the area set in the image, acquire information on an image near at least one of the area before the change and the area after the change, correct an image in at least one of the area before the change and the area after the change based on the acquired information, and control a display unit to sequentially display the images in the area before the change and the area after the change based on the result of the correction.

24 Claims, 10 Drawing Sheets

FIG. 3A

DEFAULT WEIGHT PLACEMENT TABLE

| 0 | 0 | 0 | 0 | 0 | 0 |
|---|---|---|---|---|---|
| 0 | 2 | 4 | 4 | 2 | 0 |
| 0 | 4 | 15 | 15 | 4 | 0 |
| 0 | 4 | 15 | 15 | 4 | 0 |
| 0 | 2 | 4 | 4 | 2 | 0 |
| 0 | 0 | 0 | 0 | 0 | 0 |

FIG. 3B

WEIGHT PLACEMENT TABLE FOR REDUCTION

| 0 | 0 | 0 | 0 | 0 | 0 |
|---|---|---|---|---|---|
| 0 | 1 | 2 | 2 | 1 | 0 |
| 0 | 2 | 20 | 20 | 2 | 0 |
| 0 | 2 | 20 | 20 | 2 | 0 |
| 0 | 1 | 2 | 2 | 1 | 0 |
| 0 | 0 | 0 | 0 | 0 | 0 |

FIG. 3C

WEIGHT PLACEMENT TABLE FOR EXPANSION

| 0 | 1 | 1 | 1 | 1 | 0 |
|---|---|---|---|---|---|
| 1 | 2 | 2 | 2 | 2 | 1 |
| 1 | 2 | 15 | 15 | 2 | 1 |
| 1 | 2 | 15 | 15 | 2 | 1 |
| 1 | 2 | 2 | 2 | 2 | 1 |
| 0 | 1 | 1 | 1 | 1 | 0 |

FIG. 3D

WEIGHT PLACEMENT TABLE FOR MOVEMENT

| 0 | 0 | 0 | 0 | 0 | 0 |
|---|---|---|---|---|---|
| 0 | 0 | 0 | 0 | 0 | 0 |
| 0 | 5 | 15 | 15 | 10 | 5 |
| 0 | 5 | 15 | 15 | 10 | 5 |
| 0 | 0 | 0 | 0 | 0 | 0 |
| 0 | 0 | 0 | 0 | 0 | 0 |

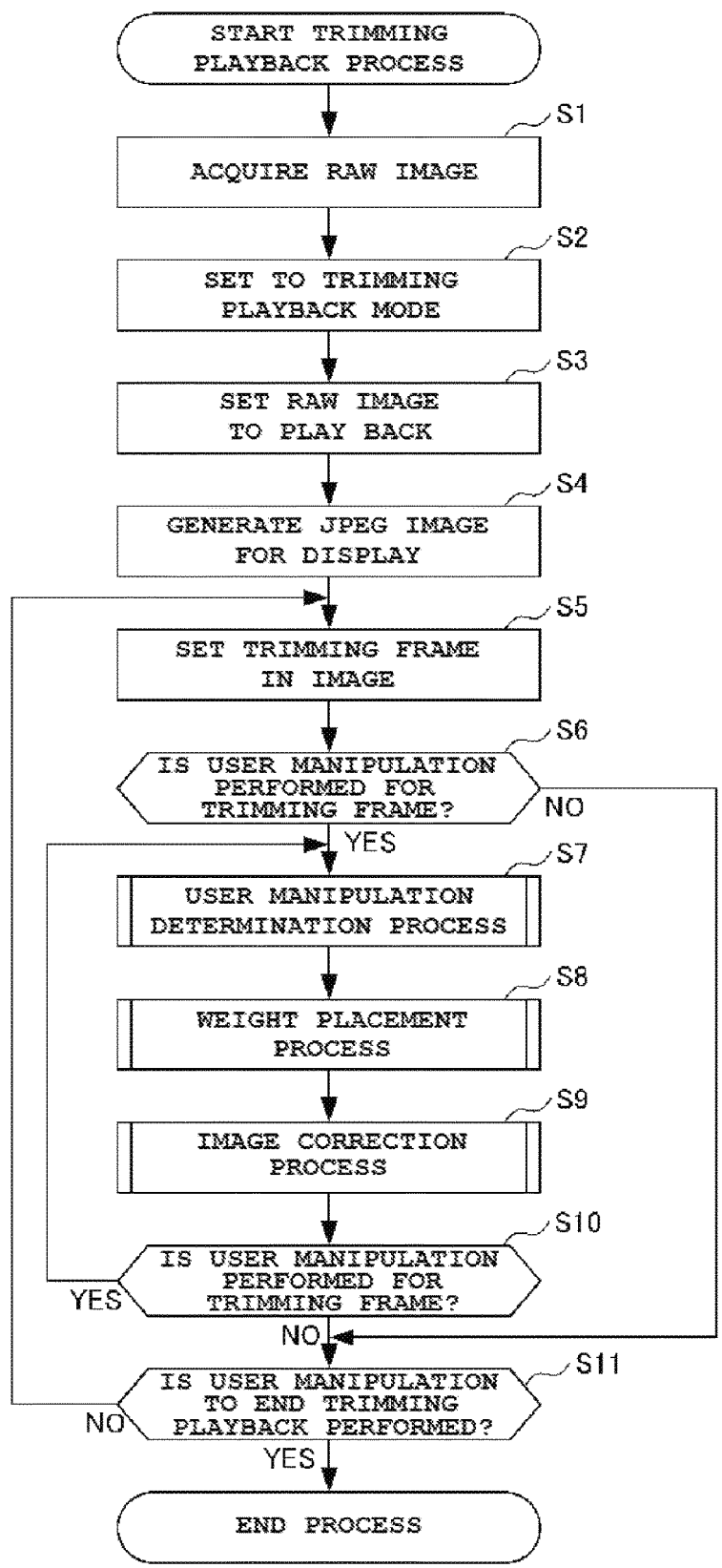

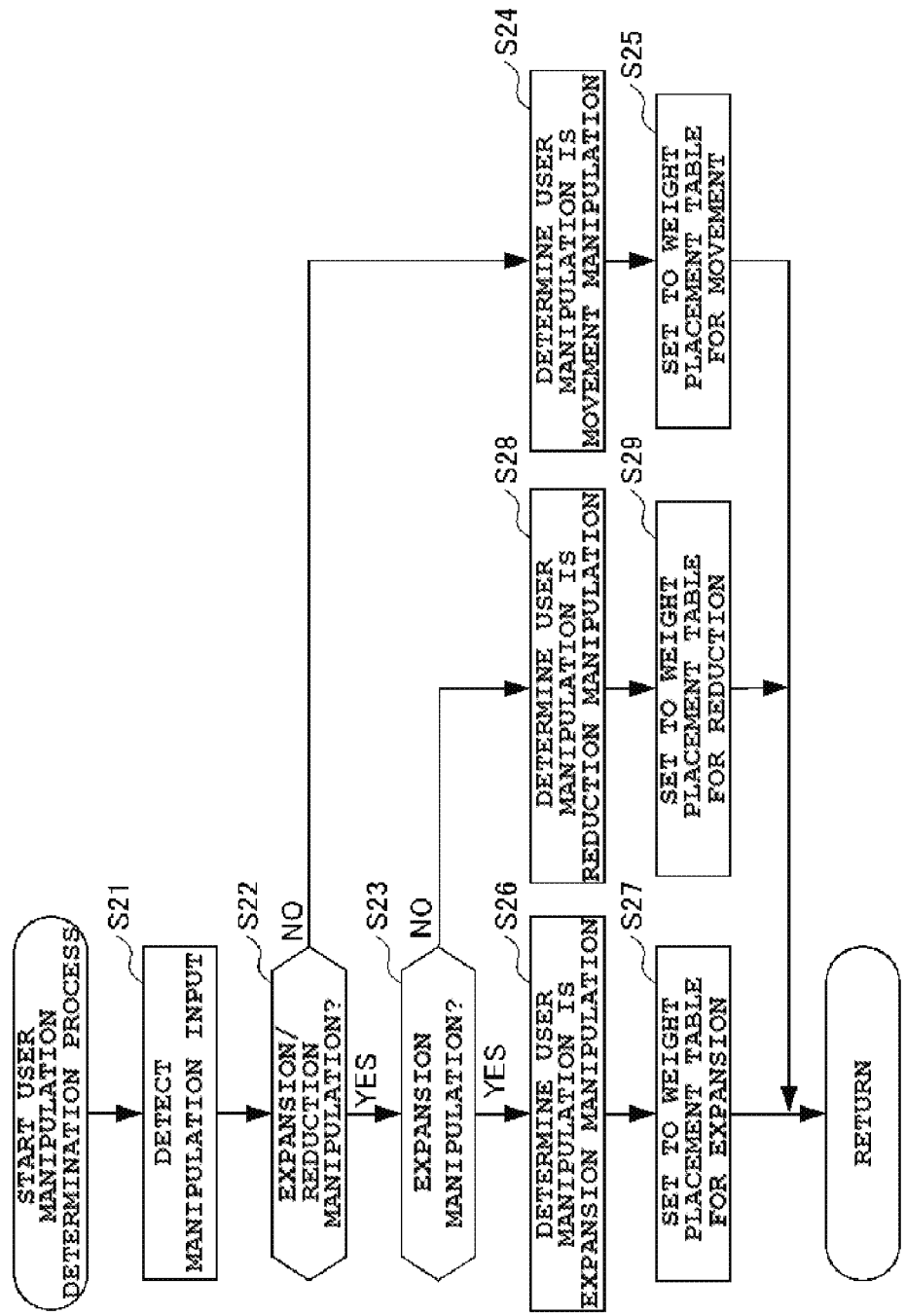

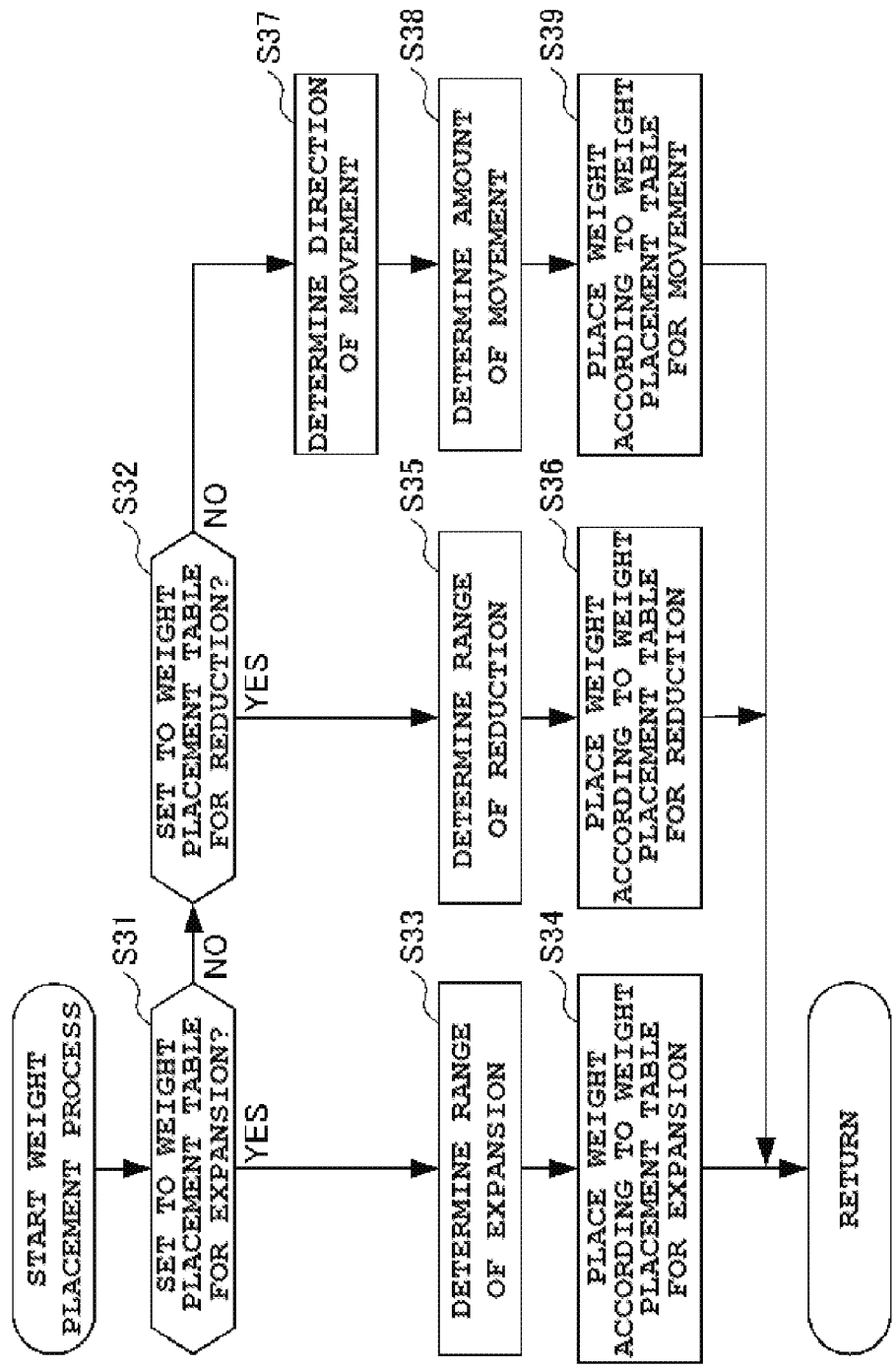

IMAGE PROCESSING APPARATUS, IMAGE PROCESSING METHOD AND RECORDING MEDIUM RECORDING PROGRAM FOR CORRECTING IMAGE IN PREDETERMINED AREA

CROSS-REFERENCE TO RELATED APPLICATIONS

This application is based upon and claims the benefit of priority under 35 USC 119 of Japanese Patent Application No. 2015-066194 filed on Mar. 27, 2015 the entire disclosure of which, including the description, claims, drawings, and abstract, is incorporated herein by reference in its entirety for all purposes.

BACKGROUND OF THE INVENTION

1. Field of the Invention

The present invention relates to an image processing apparatus, an image processing method and a computer readable recording medium for recording a program for correcting an image in a predetermined area.

2. Description of the Related Art

Conventionally, there has been known a technology for setting a plurality of areas in a given image and correcting and displaying an image in each of the set areas based on image information in the area, as disclosed in Japanese Patent Application Laid-Open Publication No. 2011-15280 published on Jan. 20, 2011.

SUMMARY OF THE INVENTION

According to an embodiment of the present invention, an image processing apparatus is provided. The image processing apparatus includes a processor and a computer-readable medium in which a computer program product is stored. The computer program product causes the processor to perform operations to acquire an image, set an area in the image, change the area set in the image, acquire information on an image near at least one of the area before the change and the area after the change, correct an image in at least one of the area before the change and the area after the change based on the acquired information, and control a display unit to sequentially display the images in the area before the change and the area after the change based on the result of the correction.

According to an embodiment of the present invention, an image processing apparatus is provided. The image processing apparatus includes a processor and a computer-readable medium in which a computer program product is stored. The computer program product causes the processor to perform operations to acquire an image, set an area in the image, change the area set in the image, acquire image information in reference to at least one of the area at a time before the change and the area at a time after the change, correct an image in at least one of the area before the change and the area after the change based on the acquired image information, and control a display unit to sequentially display the images in the area before the change and the area after the change based on the result of the correction.

According to an embodiment of the present invention, an image processing method executed by an image processing apparatus is provided. The image processing method includes acquiring an image, setting an area in the image, changing the area set in the image, acquiring information on an image near at least one of the area before the change and the area after the change, correcting an image in at least one of the area before the change and the area after the change based on the acquired information, and controlling a display unit to sequentially display the images in the area before the change and the area after the change based on the result of the correction.

According to an embodiment of the present invention, an image processing method executed by an image processing apparatus is provided. The image processing method includes acquiring an image, setting an area in the image, changing the area set in the image, acquiring image information in reference to at least one of the area at a time before the change and the area at a time after the change, correcting an image in at least one of the area before the change and the area after the change based on the acquired image information, and controlling a display unit to sequentially display the images in the area before the change and the area after the change based on the result of the correction.

According to an embodiment of the present invention, a non-transitory computer-readable recording medium for recording a program readable by a computer is provided. The program causes the computer to perform operations to acquire an image, set an area in the image, change the area set in the image, acquire information on an image near at least one of the area before the change and the area after the change, correct an image in at least one of the area before the change and the area after the change based on the acquired information, and control a display unit to sequentially display the images in the area before the change and the area after the change based on the result of the correction.

According to an embodiment of the present invention, a non-transitory computer-readable recording medium for recording a program readable by a computer is provided. The program causes the computer to perform operations to acquire an image, set an area in the image, change the area set in the image, acquire image information in reference to at least one of the area at a time before the change and the area at a time after the change, correct an image in at least one of the area before the change and the area after the change based on the acquired image information, and control a display unit to sequentially display the images in the area before the change and the area after the change based on the result of the correction.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

Here:

FIG. 3A is a schematic diagram for showing a default weight placement table which is an example of a weight placement table.

FIG. 3B is a schematic diagram for showing a weight placement table which is used when reducing a trimming frame.

FIG. 3C is a schematic diagram for showing a weight placement table which is used when expanding a trimming frame.

FIG. 3D is a schematic diagram for showing a weight placement table which is used when moving a trimming frame.

FIG. 4 is a flow chart for showing the trimming playback process executed by the image processing apparatus of FIG. 1 including the functional configuration shown in FIG. 2.

FIG. 5 is a flow chart for showing a user manipulation determination process.

FIG. 6 is a flow chart for showing a weight placement process.

DETAILED DESCRIPTION OF THE PREFERRED EMBODIMENT

Hereinafter, embodiments of the present invention will be described with reference to the accompanying drawings.

First Embodiment

Figure 1:
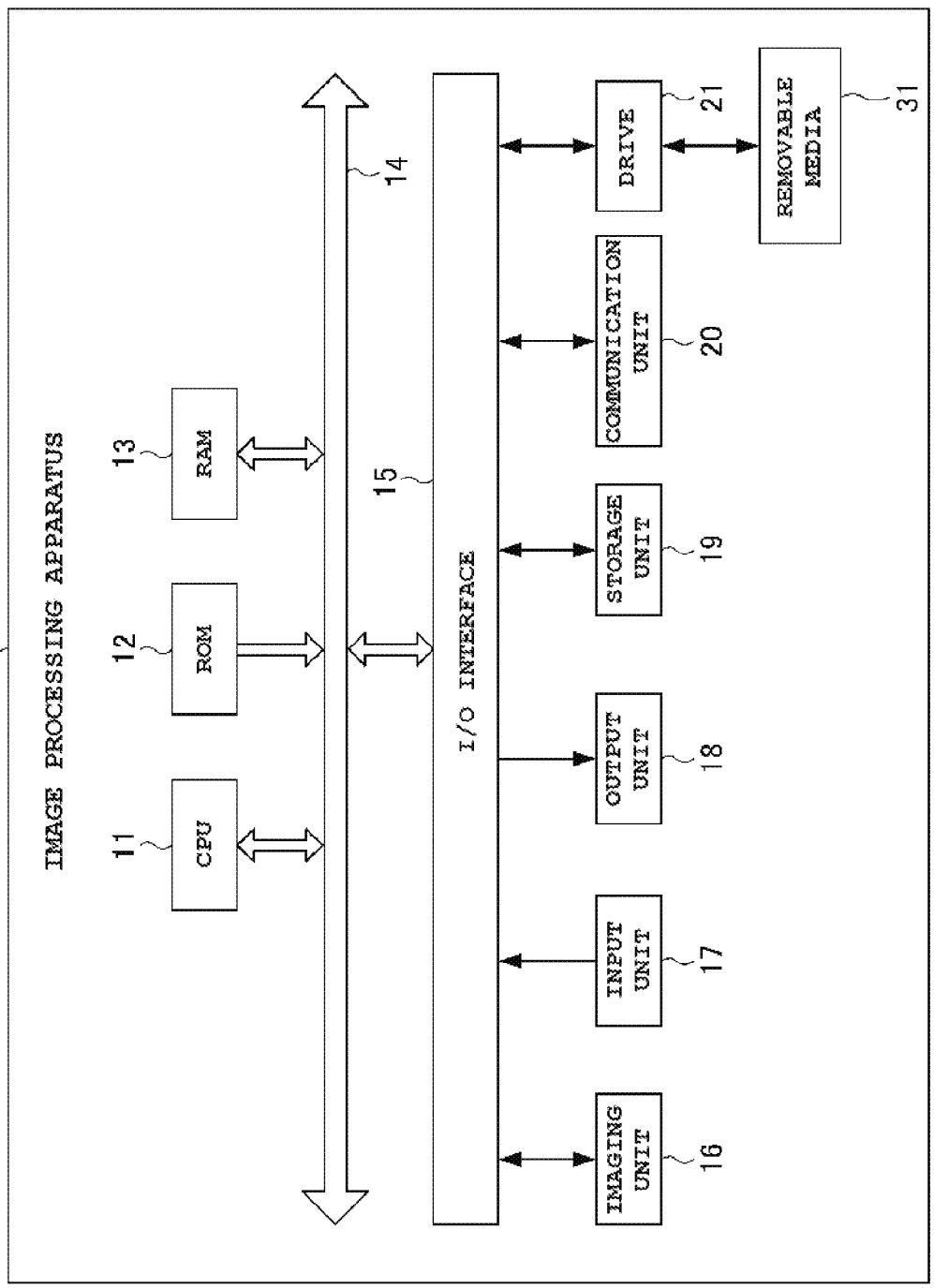
FIG. 1 is a block diagram showing a hardware configuration of an image processing apparatus according to an embodiment of the present invention.

FIG. 1 is a block diagram showing a hardware configuration of an image processing apparatus 1 according to an embodiment of the present invention.

For example, the image processing apparatus 1 is realized by a digital camera.

The image processing apparatus 1 includes a CPU (Central Processing Unit) 11, a ROM (Read Only Memory) 12, a RAM (Random Access Memory) 13, a bus 14, an I/O interface 15, an imaging unit 16, an input unit 17, an output unit 18, a storage unit 19, a communication unit 20, and a drive 21.

The CPU 11 executes various processes according to programs stored in the ROM 12 or loaded in the RAM 13 from the storage unit 19.

In the RAM 13, there are stored data necessary for the CPU 11 to execute various processes, and the like.

The CPU 11, the ROM 12 and the RAM 13 are connected to each other via the bus 14. The I/O interface 15 is also connected to the bus 14. The imaging unit 16, the input unit 17, the output unit 18, the storage unit 19, the communication unit 20, and the drive 21 are connected to the I/O interface 15.

The imaging unit 16 includes an optical lens unit and an image sensor (not shown in the drawing).

The optical lens unit includes lenses for collecting light to photograph a subject such as a focus lens and a zoom lens.

The focus lens forms an image of a subject on a light-receiving surface of the image sensor. The zoom lens freely changes the focal length within a predetermined range.

Further, the optical lens unit is provided with a peripheral circuit to adjust parameters such as focusing, exposure, and/or white balancing, as necessary.

The image sensor includes a photoelectric conversion element, an AFE (Analog Front End), and the like.

The photoelectric conversion element includes a CMOS (Complementary Metal Oxide Semiconductor) type photoelectric conversion element, for example. The subject's image is input to the photoelectric conversion element from the optical lens unit. The photoelectric conversion element performs photoelectric conversion (image capturing) of the subject's image and accumulates image signals for a predetermined period of time. The photoelectric conversion element provides the AFE with the accumulated image signals sequentially.

The AFE executes various signal processing operations such as A/D (Analog/Digital) conversion on the analog image signals. Digital signals are generated by the signal processing operations and output as output signals of the imaging unit 16.

The output signal of the imaging unit 16 is hereinafter referred to as "captured image data". The captured image data is supplied to the CPU 11. In the present embodiment, the captured image data can be output as still image data in the Raw format (hereinafter, also referred to as a "Raw image") such as BAYER array data.

The input unit 17 includes various buttons, and a variety of information is input via the input unit 17 in response to manipulation by a user.

The output unit 18 includes a display, a speaker, or the like, and outputs images or voices.

The storage unit 19 includes a hard disk, a DRAM (Dynamic Random Access Memory), or the like, and various image data is stored therein.

The communication unit 20 controls communication with different devices (not shown in the drawing) via a network such as Internet.

A removable media 31 including a magnetic disk, an optical disk, a magneto-optical disc, a semiconductor memory, or the like, is mounted on the drive 21. A program read out from the removable media 31 by the drive 21 is installed in the storage unit 19 as necessary. Similarly to the storage unit 19, the removable media 31 stores various data such as the image data stored in the storage unit 19.

Figure 2:
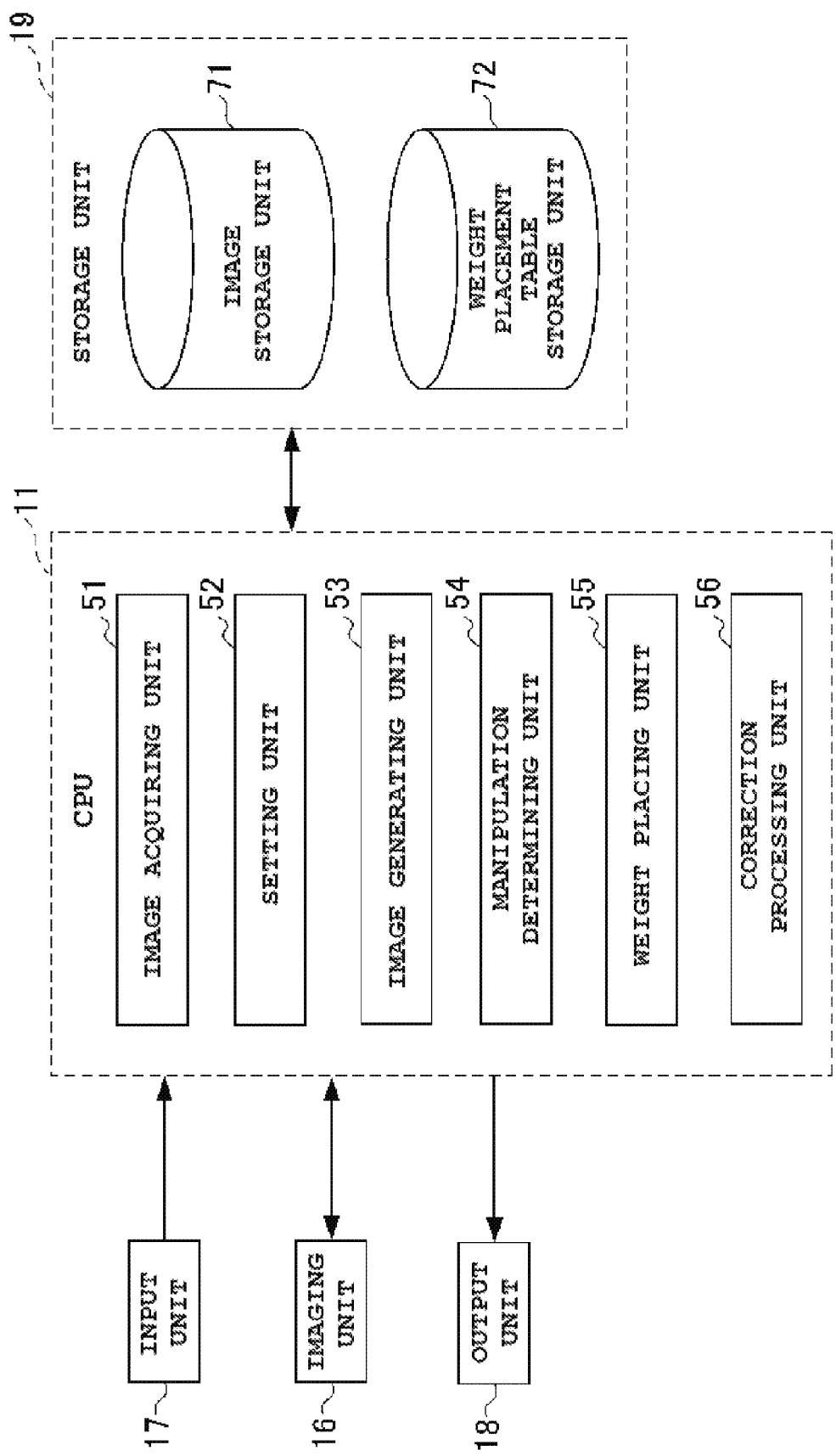
FIG. 2 is a functional block diagram showing a functional configuration of the image processing apparatus of FIG. 1 for executing a trimming playback process.

FIG. 2 is a functional block diagram showing a functional configuration of the image processing apparatus 1 of FIG. 1 for executing a trimming playback process.

The trimming playback process means a series of actions taken in order to set a trimming frame (for example, a rectangular frame) in a Raw image and play back an image in the trimming frame while changing the position and/or the size of the trimming frame.

In the case of executing the trimming playback process, an imaging acquiring unit 51, a setting unit 52, an image generating unit 53, a manipulation determining unit 54, a weight placing unit 55, and a correction processing unit 56 of the CPU 11 function as shown in FIG. 2.

In an area of the storage unit 19, an image storage unit 71 and a weight placement table storage unit 72 are configured.

In the image storage unit 71, there is stored the captured image data or image data converted into a format for display (for example, the JPEG format).

In the weight placement table storage unit 72, there are stored various weight placement tables for manipulations of the trimming frame. The weight placement table is used, when correcting an image in the trimming frame, to reflect an image in a surrounding area according to a manipulation of the trimming frame to the correction. The weight placement table defines weightings for the image in the surrounding area according to the manipulation of the trimming frame and the image in the trimming frame.

Each of FIGS. 3A to 3D is a schematic diagram for showing an example of the weight placement table. FIG. 3A is a schematic diagram for showing a default weight placement table. FIG. 3B is a schematic diagram for showing a weight placement table which is used when reducing the trimming frame. FIG. 3C is a schematic diagram for showing a weight placement table which is used when expanding the trimming frame. FIG. 3D is a schematic diagram for showing a weight placement table which is used when moving the trimming frame.

As shown in FIG. 3A, the default weight placement table is used in cases other than expansion/reduction and movement of the trimming frame. In the default weight placement table, an area in the trimming frame is weighted by 60% and a surrounding area of the trimming frame is almost uniformly weighted by 40%.

As shown in FIG. 3B, an area in the trimming frame is weighted by 80% and a surrounding area of the trimming frame is almost uniformly weighted by 20% in the weight placement table used when reducing the trimming frame.

Further, as shown in FIG. 3C, an area in the trimming frame is weighted by 60% and a surrounding area which is broader than that of the default weight placement table is almost uniformly weighted by 40% in the weight placement table used when expanding the trimming frame.

As shown in FIG. 3D, an area in the trimming frame is weighted by 60% and a surrounding area in the rear of the direction of movement of the trimming frame is weighted by 10% in the weight placement table used when moving the trimming frame. Further, a surrounding area in the front of the direction of movement of the trimming frame is weighted by 30% and the value of weight is greater in a part of the surrounding area closer to the trimming frame.

The image acquiring unit 51 acquires a Raw image output from the imaging unit 16 and allows it to be stored in the image storage unit 71.

The setting unit 52 sets the image processing apparatus 1 to a trimming playback mode in which an image in the trimming frame (a display area set by the user) is played back solely or the image and its original whole image before trimming the image (hereinafter, referred to as the "original image") are played back simultaneously.

In the case of playing back the image in the trimming frame and the original image simultaneously in the trimming playback mode, the image in the trimming frame can be played back so as to be superposed onto the original image as a small image (hereinafter, referred to as a "wipe image"), for example.

The user can select whether to play back the image in the trimming frame solely or play back the image in the trimming frame and the original image simultaneously.

Further, the setting unit 52 sets a Raw image to play back in the trimming playback process according to the user's selection.

The setting unit 52 sets a trimming frame in the Raw image to play back according to a manipulation of the user.

The setting unit 52 ends the trimming playback process in the case that the user performs a manipulation to instruct to end the trimming playback process.

The image generating unit 53 generates a JPEG image for display from the Raw image to play back which is set by the setting unit 52.

The manipulation determining unit 54 determines whether or not the user performs a manipulation for the trimming frame.

In the case that it is determined the user performs a manipulation for the trimming frame, the manipulation determining unit 54 executes a user manipulation determination process (which will be described later) and sets a weight placement table according to the manipulation to the image.

The weight placing unit 55 executes a weight placement process (which will be described later) based on the weight placement table set in the user manipulation determination process and places weight (i.e. weighting) to an image in a surrounding area of the trimming frame after the manipulation and an image in the trimming frame.

The correction processing unit 56 executes an image correction process (which will be described later) based on the weight placed by the weight placing unit 55.

In the following, it will be described how the image processing apparatus 1 operates.

FIG. 4 is a flow chart for showing the trimming playback process executed by the image processing apparatus 1 of FIG. 1 including the functional configuration shown in FIG. 2.

The trimming playback process is started by a manipulation to instruct to start the trimming playback process input to the input unit 17 by the user.

At Step S1, the image acquiring unit 51 acquires a Raw image output from the imaging unit 16 and allows it to be stored in the image storage unit 71.

The acquisition of the Raw image can be performed by a manipulation of half-shutter, for example.

At Step S2, the setting unit 52 sets the image processing apparatus 1 to the trimming playback mode.

At Step S3, the setting unit 52 sets a Raw image to play back in the trimming playback process according to the user's selection.

At Step S4, the image generating unit 53 generates a JPEG image for display from the Raw image to play back which is set by the setting unit 52.

At Step S5, the setting unit 52 sets a trimming frame in the Raw image to play back according to a manipulation of the user.

At Step S6, the manipulation determining unit 54 determines whether or not the user performs a manipulation for the trimming frame.

In the case that the user performs a manipulation for the trimming frame, the determination at Step S6 is "YES" and the process proceeds to Step S7.

On the other hand, in the case that the user performs no manipulation for the trimming frame, the determination at Step S6 is "NO" and the process proceeds to Step S11.

At Step S7, the manipulation determining unit 54 executes the user manipulation determination process (which will be described later).

At Step S8, the weight placing unit 55 executes the weight placement process based on the weight placement table set in the user manipulation determination process.

At Step S9, the correction processing unit 56 executes the image correction process based on the weight placed by the weight placing unit 55.

At Step S10, the manipulation determining unit 54 continues to determine whether or not the user performs a manipulation for the trimming frame.

In the case that the user performs a manipulation for the trimming frame, the determination at Step S10 is "YES" and the process returns to Step S7.

On the other hand, in the case that the user performs no manipulation for the trimming frame, the determination at Step S10 is "NO" and the process proceeds to Step S11.

At Step S11, the setting unit 52 determines whether or not the user performs a manipulation to instruct to end the trimming playback process.

In the case that the user performs the manipulation to instruct to end the trimming playback process, the determination at Step S11 is "YES" and the trimming playback process ends.

On the other hand, in the case that the user does not perform the manipulation to instruct to end the trimming playback process, the determination at Step S11 is "NO" and the process returns to S5.

In the following, the user manipulation determination process executed at Step S7 of the trimming playback process will be described.

FIG. 5 is a flow chart for showing the user manipulation determination process.

At Step S21, the manipulation determining unit 54 detects a manipulation input by the user.

At Step S22, the manipulation determining unit 54 determines whether or not the user's manipulation is a manipulation for expanding or reducing the trimming frame.

In the case that the user's manipulation is a manipulation for expanding or reducing the trimming frame, the determination at Step S22 is "YES" and the process proceeds to Step S23.

On the other hand, in the case that the user's manipulation is not a manipulation for expanding or reducing the trimming frame, the determination at Step S22 is "NO" and the process proceeds to Step S24.

At Step S23, the manipulation determining unit 54 determines whether or not the user's manipulation is a manipulation for expanding the trimming frame.

In the case that user's manipulation is a manipulation for expanding the trimming frame, the determination at Step S23 is "YES" and the process proceeds to Step S26.

On the other hand, in the case that user's manipulation is not a manipulation for expanding the trimming frame, the determination at Step S23 is "NO" and the process proceeds to Step S28.

At Step S24, the manipulation determining unit 54 determines that the user's manipulation is a manipulation for moving the trimming frame.

At Step S25, the manipulation determining unit 54 sets the weight placement table to use to the weight placement table used when moving the trimming frame (the weight placement table for movement; see FIG. 3D).

At Step S26, the manipulation determining unit 54 determines that the user's manipulation is a manipulation for expanding the trimming frame.

At Step S27, the manipulation determining unit 54 sets the weight placement table to use to the weight placement table used when expanding the trimming frame (the weight placement table for expansion; see FIG. 3C).

At Step S28, the manipulation determining unit 54 determines that the user's manipulation is a manipulation for reducing the trimming frame.

At Step S29, the manipulation determining unit 54 sets the weight placement table to use to the weight placement table used when reducing the trimming frame (the weight placement table for reduction; see FIG. 3B).

After Steps S25, S27 and S29, the process returns to the trimming playback process.

In the following, the weight placement process executed at Step S8 of the trimming playback process will be described.

FIG. 6 is a flow chart for showing the weight placement process.

At Step S31, the weight placing unit 55 determines whether or not the weight placement table is set to the weight placement table used when expanding the trimming frame (the weight placement table for expansion).

In the case that the weight placement table is not set to the weight placement table used when expanding the trimming frame, the determination at Step S31 is "NO" and the process proceeds to Step S32.

On the other hand, in the case that the weight placement table is set to the weight placement table used when expanding the trimming frame, the determination at Step S31 is "YES" and the process proceeds to Step S33.

At Step S32, the weight placing unit 55 determines whether or not the weight placement table is set to the weight placement table used when reducing the trimming frame (the weight placement table for reduction).

In the case that the weight placement table is set to the weight placement table used when reducing the trimming frame, the determination at Step S32 is "YES" and the process proceeds to Step S35.

In the case that the weight placement table is not set to the weight placement table used when reducing the trimming frame, the determination at Step S32 is "NO" and the process proceeds to Step S37.

At Step S33, the weight placing unit 55 determines the range of expansion of the trimming frame by the user's manipulation.

At Step S34, the weight placing unit 55 places weight to an image in a surrounding area of the trimming frame and an image in the trimming frame based on the weight placement table used when expanding the trimming frame according to the range of expansion of the trimming frame by the user's manipulation.

At Step S35, the weight placing unit 55 determines the range of reduction of the trimming frame by the user's manipulation.

At Step S36, the weight placing unit 55 places weight to an image in a surrounding area of the trimming frame and an image in the trimming frame based on the weight placement table used when reducing the trimming frame according to the range of reduction of the trimming frame by the user's manipulation.

At Step S37, the weight placing unit 55 determines the direction of movement of the trimming frame by the user's manipulation.

At Step S38, the weight placing unit 55 determines the amount of the movement of the trimming frame by the user's manipulation.

At Step S39, the weight placing unit 55 places weight to an images in the rear and the front of the direction of the movement of the trimming frame and an image in the trimming frame based on the weight placement table used when moving the trimming frame (see FIG. 3D) in a range corresponding to the amount of the movement of the trimming frame by the user's manipulation.

After Steps S34, S36 and S39, the process returns to the trimming playback process.

In the following, the image correction process executed at Step S9 of the trimming playback process will be described.

Figure 7:
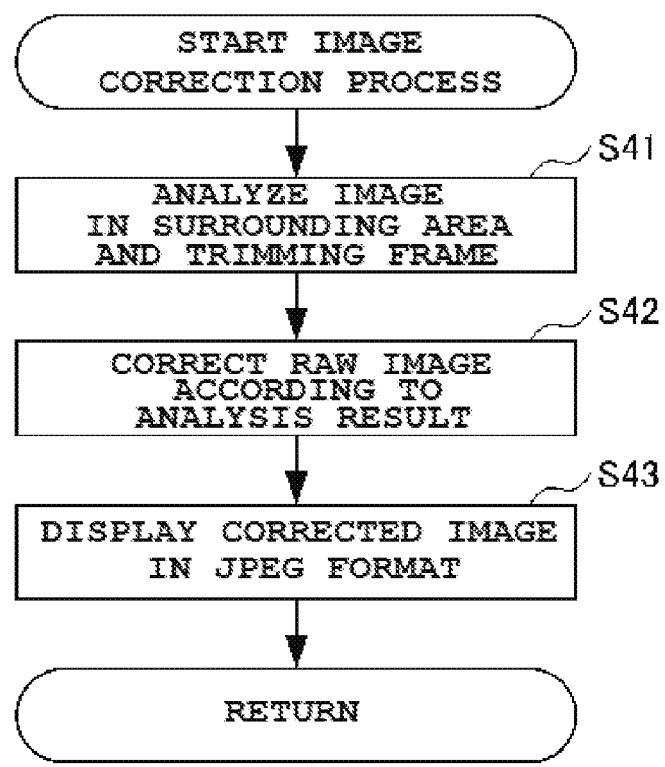
FIG. 7 is a flow chart for showing an image correction process.

FIG. 7 is a flow chart for showing the image correction process.

At Step S41, the correction processing unit 56 analyzes the images in the surrounding area and the trimming frame to which the weight is placed to acquire image information.

Here, the image information includes some or all of the parameters such as brightness, lightness, white balance, colors, gamma characteristics, and the like.

At Step S42, the correction processing unit 56 corrects the Raw image according to the result of the analysis of Step S41.

More specifically, the correction processing unit 56 performs correction of the parameters such as brightness of the images in the surrounding area and the trimming frame to which the weight is placed to properly adjust the parameters over the images in the surrounding area and the trimming frame.

Here, the correction processing unit 56 adjusts the parameters by using the image information weighted according to the weight placement.

For example, in the case that gain for optimizing the brightness is different in the image in the trimming frame and the image in the surrounding area, the correction processing unit 56 calculates the gain in consideration of the weight of gain of each area.

Further, the correction processing unit 56 calculates the gain for the brightness to meet the condition that neither a white hole nor black crushing is generated over the images in the surrounding area and the trimming frame.

Further, in the case of performing amplification processing, exposure of the Raw image acquired in the trimming playback process may be set to a value lower than a target value of exposure for the normal shooting and the amplification processing may be performed only by plus gain in order to prevent gain from being minus.

By this, loss of gradation due to application of the minus gain can be suppressed and it is possible to reduce a possibility that white holes will generate in some portions of the image in the trimming frame.

At Step S43, the image generating unit 53 displays the corrected image in the JPEG format.

After Step S43, the process returns to the trimming playback process.

As a result of performing the above process by the image processing apparatus 1 according to the present embodiment, the weight is placed to the image in the surrounding area of the trimming frame and the image in the trimming frame according to the manipulation for expansion, reduction, or movement of the trimming frame, or the like.

Further, the image processing apparatus 1 performs image correction by using the result of analysis of the image in the surrounding area of the trimming frame as well as the image in the trimming frame according to the weight.

Therefore, it is possible to correct the image in the trimming frame so that the user does not feel a sense of incompatibility in the case of displaying images sequentially.

Second Embodiment

Next, a second embodiment of the present invention is described.

An image processing apparatus 1 according to the second embodiment includes a hardware configuration similar to that of the image processing apparatus 1 according to the first embodiment.

In the following, a functional configuration of the image processing apparatus 1 according to the second embodiment will be described.

The image acquiring unit 51 acquires a Raw image output from the imaging unit 16 and allows it to be stored in the image storage unit 71.

The acquisition of the Raw image can be performed by a manipulation of half-shutter, for example.

The setting unit 52 sets the image processing apparatus 1 to a trimming playback mode in which an image in a trimming frame (a display area set by the user) is played back solely or the image and its original whole image before trimming the image (hereinafter, referred to as the "original image") are played back simultaneously.

In the case of playing back the image in the trimming frame and the original image simultaneously in the trimming playback mode, the image in the trimming frame can be played back so as to be superposed onto the original image as a small image (i.e. the wipe image), for example.

The user can select whether to play back the image in the trimming frame solely or play back the image in the trimming frame and the original image simultaneously.

Further, the setting unit 52 sets a Raw image to play back in a trimming playback process according to the user's selection.

The setting unit 52 sets a trimming frame in the Raw image to play back according to a manipulation of the user.

The setting unit 52 ends the trimming playback process in the case that the user performs a manipulation to instruct to end the trimming playback process.

The image generating unit 53 generates a JPEG image for display from the Raw image to play back which is set by the setting unit 52.

The manipulation determining unit 54 determines whether or not the user's manipulation for changing the trimming frame is detected.

In other words, the manipulation determining unit 54 determines whether or not a manipulation for setting a trimming frame in a'position separated from the set trimming frame (a separated position) is performed.

The weight placing unit 55 sets weight (i.e. weighting) for images in the trimming frames before and after the change.

The correction processing unit 56 acquires image information in the trimming frame after the change.

Further, the correction processing unit 56 corrects the Raw image in the trimming frame by weighting the image information in the trimming frames before and after the change.

Next, it will be described how the image processing apparatus 1 operates.

Figure 8:
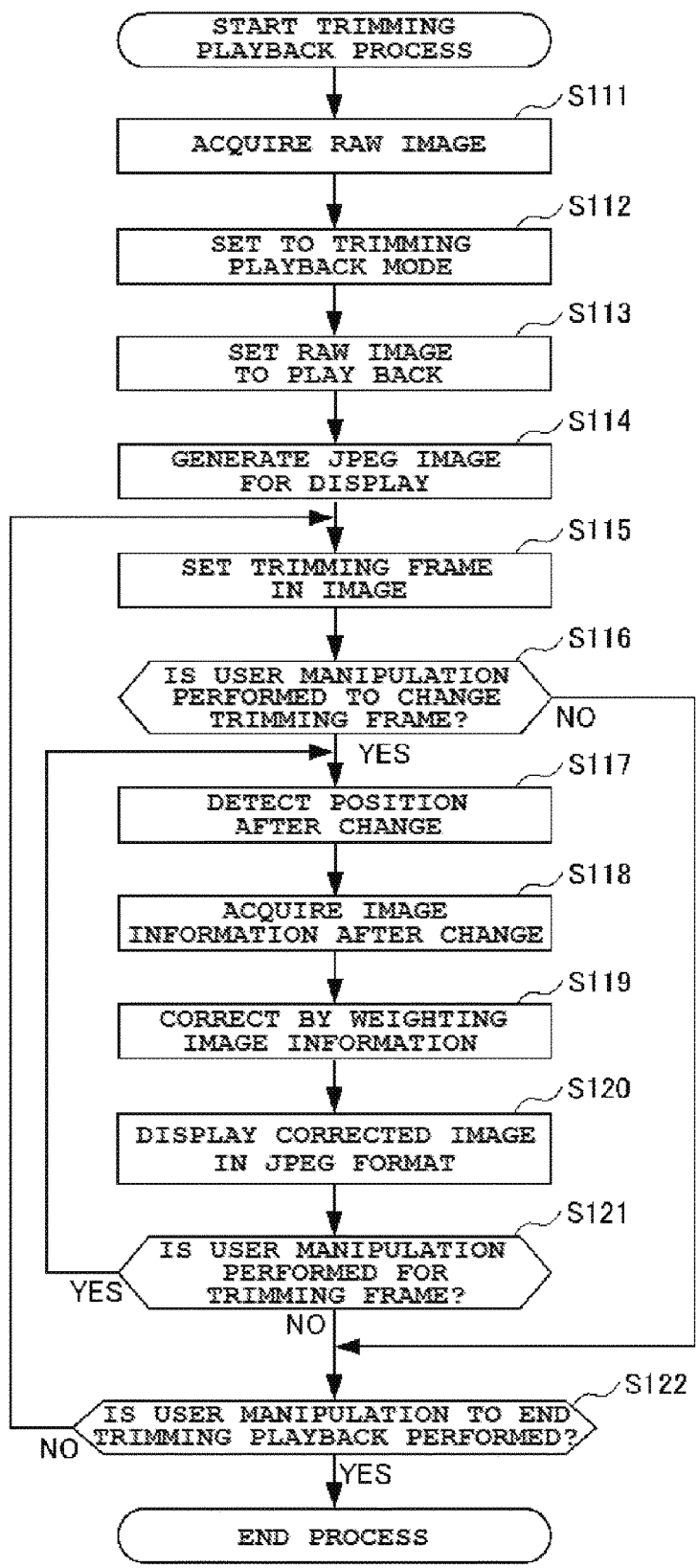
FIG. 8 is a flow chart for showing a trimming playback process executed by an image processing apparatus of a second embodiment of the present invention.

FIG. 8 is a flow chart for showing the trimming playback process executed by the image processing apparatus 1 of FIG. 1 including the functional configuration shown in FIG. 2.

The trimming playback process is started by a manipulation to instruct to start the trimming playback process input to the input unit 17 by the user.

At Step S111, the image acquiring unit 51 acquires a Raw image output from the imaging unit 16 and allows it to be stored in the image storage unit 71.

The acquisition of the Raw image can be performed by a manipulation of half-shutter, for example.

At Step S112, the setting unit 52 sets the image processing apparatus 1 to the trimming playback mode.

At Step S113, the setting unit 52 sets a Raw image to play back in the trimming playback process according to the user's selection.

At Step S114, the image generating unit 53 generates a JPEG image for display from the Raw image to play back which is set by the setting unit 52.

At Step S115, the setting unit 52 sets a trimming frame in the Raw image to play back according to a manipulation of the user.

At Step S116, the manipulation determining unit 54 determines whether or not the user's manipulation for changing the trimming frame is detected.

In other words, the manipulation determining unit 54 determines whether or not a manipulation for setting a trimming frame in a position separated from the trimming frame set at Step S115 is performed.

In the case that the user's manipulation for changing the trimming frame is detected, the determination at Step S116 is "YES" and the process proceeds to Step S117.

In the case that the user's manipulation for changing the trimming frame is not detected, the determination at Step S116 is "NO" and the process proceeds to Step S122.

At Step S117, the manipulation determining unit 54 detects the position of the trimming frame after the change.

At Step S118, the correction processing unit 56 acquires image information in the trimming frame after the change.

Here, the image information includes some or all of the parameters such as brightness, lightness, white balance, colors, gamma characteristics, and the like.

At Step S119, the correction processing unit 56 corrects the Raw image in the trimming frame by weighting the image information in the trimming frame before and after the change.

For example, the correction processing unit 56 acquires the image information in each of the trimming frame before the change (the present) and the trimming frame after the change (the next frame) and uses the image information before the change for correction of the image information after the change when correcting an image to be displayed next.

More specifically, the correction processing unit 56 gives a weighting of 30% to the image information of the image before the change and a weighting of 70% to the image information of the image after the change according to the setting of the weight placing unit 55 (for example, weight is given to a parameter for correction of each of the images and an average of the parameter is calculated) and corrects the image in the trimming frame after the change.

At Step S120, the image generating unit 53 displays the corrected image in the JPEG format on the output unit 18.

At Step S121, the manipulation determining unit 54 continues to determine whether or not the user performs a manipulation for changing the trimming frame.

In the case that the user's manipulation for changing the trimming frame is detected, the determination at Step S121 is "YES" and the process returns to Step S117.

In the case that the user's manipulation for changing the trimming frame is not detected, the determination at Step S121 is "NO" and the process proceeds to Step S122.

At Step S122, the setting unit 52 determines whether or not the user performs a manipulation to instruct to end the trimming playback process.

In the case that the user performs the manipulation to instruct to end the trimming playback process, the determination at Step S122 is "YES" and the trimming playback process ends.

On the other hand, in the case that the user does not perform the manipulation to instruct to end the trimming playback process, the determination at Step S122 is "NO" and the process returns to Step S115.

As a result of performing the above process, the image processing apparatus 1 of the present embodiment corrects the image in the trimming frame after the change according to the manipulation for changing the trimming frame by giving the weighting to the image in each of the trimming frames before and after the change and using the image information in the trimming frame before change.

Therefore, it is possible to correct the image in the trimming frame so that the user does not feel a sense of incompatibility in the case of displaying images sequentially.

Third Embodiment

Next, a third embodiment of the present invention is described.

An image processing apparatus 1 according to the third embodiment includes a hardware configuration similar to that of the image processing apparatus 1 according to the first embodiment.

In the following, a functional configuration of the image processing apparatus 1 according to the third embodiment will be described.

The image acquiring unit 51 acquires a moving picture to play back in a trimming playback process according to selection of the user.

The setting unit 52 sets the image processing apparatus 1 to a trimming playback mode in which an image in a trimming frame (a display area set by the user) is played back solely or the image and its original whole image before trimming the image (hereinafter, referred to as the "original image") are played back simultaneously.

In the case of playing back the image in the trimming frame and the original image simultaneously in the trimming playback mode, the image in the trimming frame can be played back so as to be superposed onto the original image as a small image (i.e. the wipe image), for example.

The user can select whether to play back the image in the trimming frame solely or play back the image in the trimming frame and the original image simultaneously.

Further, the setting unit 52 sets the trimming frame surrounding a subject of interest selected by the user.

The setting unit 52 ends the trimming playback process in the case that the user performs a manipulation to instruct to end the trimming playback process.

The image generating unit 53 displays the moving picture acquired by the image acquiring unit 51 for editing.

For example, the image generating unit 53 displays the moving picture for editing at a frame rate slower than the original frame rate of the moving picture (i.e. slow playback).

The manipulation determining unit 54 determines whether or not the user selects a specific subject of interest.

The weight placing unit 55 sets weight (i.e. weighting) for an image in the trimming frame before the image is changed and the image in the trimming frame after the change.

The correction processing unit 56 acquires image information in the trimming frame before and after the image in the trimming frame is changed.

Further, the correction processing unit 56 corrects and displays the image in the trimming frame based on the image information in the trimming frame before and after the change.

An image analyzing unit 57 detects a subject of interest in the moving picture. More specifically, the image analyzing unit 57 detects an important subject included in the moving picture as the subject of interest by using object detection.

As the image analyzing unit 57 can detect the subject of interest, the image processing apparatus 1 can automatically follow the subject of interest across a plurality of frames.

Further, the image analyzing unit 57 acquires image information in the trimming frame.

Further, the image analyzing unit 57 determines whether or not the image in the trimming frame changes.

For example, the image analyzing unit 57 determines whether or not the image in the trimming frame changes according to whether or not a change in the sum of pixel values of the image in the trimming frame is greater than a threshold value.

Next, the trimming playback process executed by the image processing apparatus 1 will be described.

Figure 9:
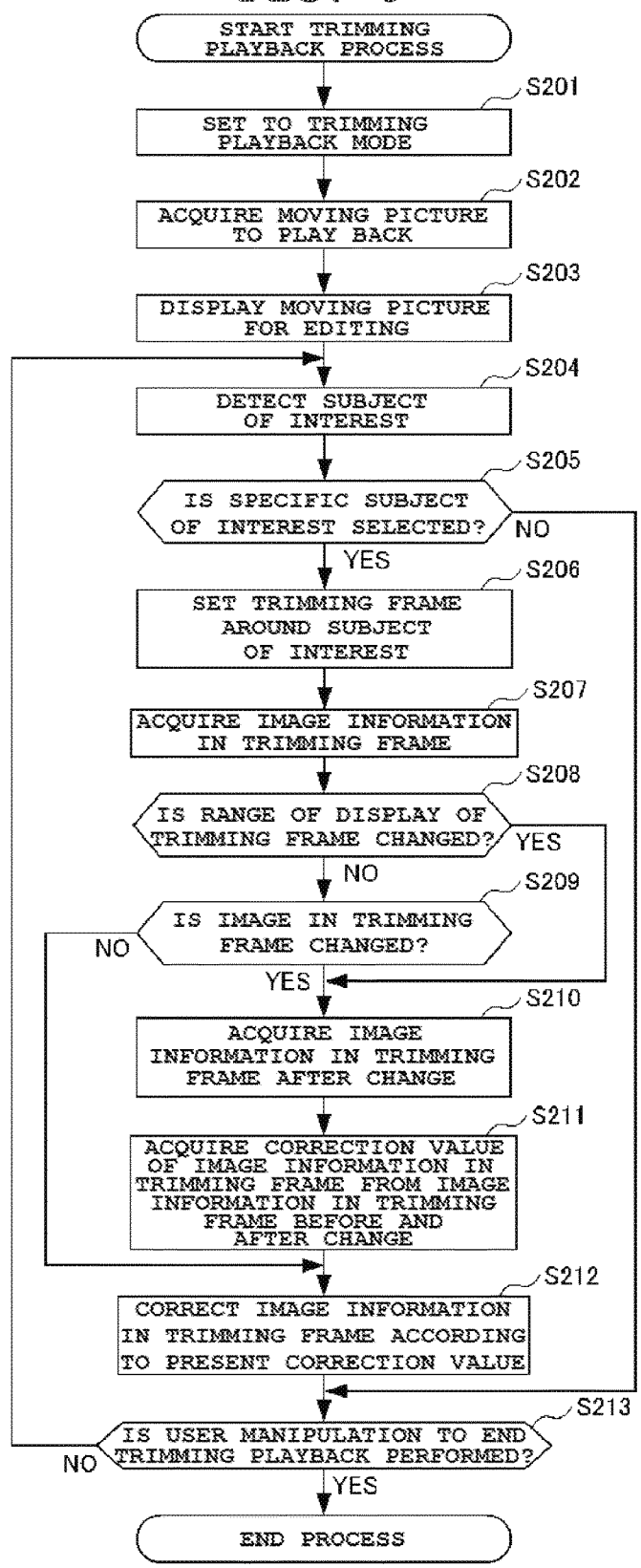
FIG. 9 is a flow chart for showing a trimming playback process executed by an image processing apparatus of a third embodiment of the present invention.

FIG. 9 is a flow chart for showing the trimming playback process executed by the image processing apparatus 1 of FIG. 1 including the functional configuration shown in FIG. 2.

The trimming playback process is started by a manipulation to instruct to start the trimming playback process input to the input unit 17 by the user.

At Step S201, the setting unit 52 sets the image processing apparatus 1 to the trimming playback mode.

At Step S202, the image acquiring unit 51 acquires a moving picture to play back in the trimming playback process according to selection of the user.

At Step S203, the image generating unit 53 displays the moving picture acquired by the image acquiring unit 51 for editing (for example, slow playback).

At Step S204, the image analyzing unit 57 detects a subject of interest in the moving picture.

At Step S205, the manipulation determining unit 54 determines whether or not the user selects a specific subject of interest.

The manipulation determining unit 54 determines whether or not a new subject of interest is selected and whether or not a specific subject of interest was already selected in the previous loop.

In the case that the user selects a specific subject of interest, the determination at Step S205 is "YES" and the process proceeds to Step S206.

On the other hand, in the case that the user does not select any specific subject of interest, the determination at Step S205 is "NO" and the process proceeds to Step S213.

At Step S206, the setting unit 52 sets a trimming frame surrounding the subject of interest selected by the user.

At Step S207, the image analyzing unit 57 acquires the image information in the trimming frame.

At Step S208, the image analyzing unit 57 determines whether or not a range of display of the trimming frame is changed.

At this step, the image analyzing unit 57 determines whether or not the user changes the position, the region or the shape of the trimming frame.

In the case that the range of display of the trimming frame is not changed, the determination at Step S208 is "NO" and the process proceeds to Step S209.

On the other hand, in the case that the range of display of the trimming frame is changed, the determination at Step S208 is "YES" and the process proceeds to Step S210.

At Step S209, the image analyzing unit 57 determines whether or not the image in the trimming frame changes.

In the case that the image in the trimming frame changes, the determination at Step S209 is "YES" and the process proceeds to Step S210.

On the other hand, in the case that the image in the trimming frame does not change, the determination at Step S209 is "NO" and the process proceeds to Step S212.

At Step S210, the image analyzing unit 57 acquires the image information in the trimming frame after the change.

At Step S211, the correction processing unit 56 acquires a correction value for correcting the image in the trimming frame based on the image information in the trimming frame before and after the change.

For example, the correction processing unit 56 acquires the image information in each of the trimming frame before the change (the present) and the trimming frame after the change (the next frame) and acquires the correction value for correcting an image to be displayed next.

More specifically, the correction processing unit 56 gives a weighting of 30% to the image information of the image before the change and a weighting of 70% to the image information of the image after the change according to the setting of the weight placing unit 55 (for example, weight is given to a parameter for correction of each of the images and an average of the parameter is calculated) and uses the average as the correction value for correcting the image in the trimming frame after the change.

At Step S212, the correction processing unit 56 corrects the image in the trimming frame by using the present correction value.

At this step, in the case that the image in the trimming frame is changing, the setting unit 52 adjusts the position and the size of the trimming frame so as to follow the subject of interest after the change.

At Step S213, the setting unit 52 determines whether or not the user performs a manipulation to instruct to end the trimming playback process.

In the case that the user performs the manipulation to instruct to end the trimming playback process, the determination at Step S213 is "YES" and the trimming playback process ends.

On the other hand, in the case that the user does not perform the manipulation to instruct to end the trimming playback process, the determination at Step S213 is "NO" and the process returns to Step S204.

As a result of performing the above process, the image processing apparatus 1 of the present embodiment gives weightings, according to a change in the range of display of the trimming frame set surrounding the subject of interest or a change in an image in the trimming frame, to an image in the trimming frame before and after the change in a different frame.

After that, the image in the trimming frame after the change is corrected by applying the image information in the trimming frame in the trimming frame before the change.

Therefore, it is possible to correct the image in the trimming frame while following a specific subject in a moving picture or the like so that the user does not feel a sense of incompatibility in the case of displaying images sequentially.

Modified Example 1

The setting unit 52 may allow a manipulation history (manipulation time) of changes in the trimming frame by the manipulation of the user (expansion, reduction or movement of the trimming frame, or the like) to be stored in correspondence with cut images in the trimming frame in the image storage unit 71 as a moving picture.

For example, in the first and second embodiments, the image in the trimming frame changing according to the manipulation time can be stored as a moving picture.

Similarly, in the third embodiment, an image in the trimming frame is cut from each of a plurality frames and the cut images can be stored in series as a moving picture.

By this, it is possible to store the result of the manipulation for the trimming frame in a form which can be easily recognized.

Modified Example 2

In the above described embodiment, it is also possible to store the changes in the trimming frame by the user's manipulation in correspondence with the manipulation time, average the changes in the trimming frame by the user's manipulation and store the changes as a moving picture smoothly changing.

For example, after averaging the speed of expansion or reduction from the start time to the end time of the user's manipulation and reducing the changes in the speed, the image processing apparatus 1 can store the images in the trimming frame as a moving picture.

By this, it is possible to make a moving picture smoothly changing even in the case that the user performs a manipulation causing a great change and a viewer can feel comfortable when it is displayed.

Modified Example 3

In the above described embodiment, the trimming frame has a rectangular shape. However, the shape of the trimming frame is not limited thereto and can be set variously.

For example, the shape of the trimming frame is set to a shape of a frame drawn arbitrarily by the user or to one of a variety of shapes of the trimming frames previously prepared which is selected by the user.

By this, according to the example of the present invention, it is possible to display a sequence of images while properly correcting by using various shapes of the trimming frame according to a shape of a subject or an intention of the user.

Modified Example 4

The placement of the weight in the weight placement table of the first embodiment may be changed according to a speed of the manipulation for the trimming frame.

For example, the surrounding area of the trimming frame can be enlarged or reduced, or the value of the weight in the surrounding area of the trimming frame can be increased or decreased according to a speed of expansion or reduction of the trimming frame.

Further, the weight placement table used when moving the trimming frame can be set so that the surrounding area of the trimming frame in the front of the direction of the movement of the trimming frame can be enlarged or reduced if the speed of the movement is high or low.

Similarly, the weight of the surrounding area of the trimming frame in the front of the direction of the movement can be increased or decreased if the speed of the movement is high or low.

By this, it is possible to correct the image in the trimming frame by reflecting the user's manipulation much more.

Modified Example 5

As a modification of the first embodiment, the images in the trimming frame and the surrounding area before the manipulation are used and the images in the trimming frame and the surrounding area after the manipulation are not used when performing the image correction process.

In this case, for example, weight of an area included in the trimming frame before the manipulation but not included in the trimming frame and its surrounding area after the manipulation can be set to zero (0) to eliminate an image in the trimming frame before the manipulation from the image correction process.

By this, it is possible to correct the image in the trimming frame after the manipulation by using only the images in the trimming frame and its surrounding area after the manipulation. Thus, it is possible to properly correct the image in the trimming frame after the manipulation.

The image processing apparatus 1 configured as described above includes the image acquiring unit 51, the setting unit 52, the correction processing unit 56, and the image generating unit 53.

The image acquiring unit 51 acquires an image.

The setting unit 52 sets an area (a trimming frame) in the image acquired by the image acquiring unit 51.

The setting unit 52 changes the area set in the image.

The correction processing unit 56 acquires information on an image near at least one of the area before the change by the setting unit 52 and the area after the change by the setting unit 52.

The correction processing unit 56 corrects an image in at least one of the area before the change and the area after the change based on the acquired information.

The image generating unit 53 controls the output unit 18 to sequentially display the images in the area before the change and the area after the change based on the result of the correction by the correction processing unit 56.

By this, the image processing apparatus 1 performs correction of the image in the area from the information on the images near the area before the change and the area after the change.

Therefore, it is possible to correct the image in the area so that the user does not feel a sense of incompatibility in the case of displaying images sequentially.

In some embodiments, the correction processing unit 56 acquires information on the image in at least one of the area before the change and the area after the change.

By this, in the case a manipulation for extension, reduction or movement of the area (the trimming frame), or the like, is performed, it is possible to correct the image in the area based on the information on the image in the area before and after a change by the manipulation.

Therefore, in the case that the area is changed by the manipulation, it is possible to correct the image so that the user does not feel a sense of incompatibility when displaying images in the area sequentially.

In some embodiments, the setting unit 52 changes the position of the set area to a position separated from the area.

By this, in the case that a manipulation for changing the area (the trimming frame) is performed, it is possible to the image in the area based on the information of the image before the change and the image after the change.

Therefore, even in the case that the area is changed by the manipulation, it is possible to the image in the area so that the user does not feel a sense of incompatibility when displaying images in the area sequentially.

In some embodiments, the correction processing unit 56 further acquires information on an image in a predetermined position as information on an image near the area based on a positional relationship between the area before the change and the area after the change.

By this, it is possible to correct the image in the area by using the image information which is assumed to have a predetermined relationship with the image information in the area before the change and the area after the change.

In some embodiments, the predetermined position includes a position in the middle of the area before the change and the area after the change.

By this, it is possible to correct the image in the area by using the image information which is assumed to be a median value of the image information in the area before the change and the image information in the area after the change.

In some embodiments, the correction processing unit 56 further acquires, based on position information of at least one of the area before the change and the area after the change, information on an image in a position separated from the position of the area as the information on the image near the area.

By this, it is possible to correct the image in the area before or after the change by using the image information of a specific area separated from the area before the change or the area after the change.

In some embodiments, the correction processing unit 56 acquires information on an image near one of the area before the change and the area after the change and corrects the image in the other area based on the information.

By this, it is possible to correct the image in the area based on the information of an image in a region which is likely to be included in the area due to the change of the area.

In some embodiments, the correction processing unit 56 acquires information on an image to be displayed next in the area set by the setting unit 52.

By this, in the case of correcting a moving picture in which an image in the area changes, it is possible to correct the image in the area based on the information on the image to be displayed next.

In some embodiments, the imaging apparatus 1 includes the manipulation determining unit 54.

The manipulation determining unit 54 detects manipulation information.

The manipulation determining unit 54 determines the detected manipulation information.

The setting unit 52 sets the area in the image based on the result of the determination of the manipulation information by the manipulation determining unit 54.

By this, it is possible to set the area in the image according to the manipulation.

In some embodiments, the setting unit 52 changes the area in the image based on the result of the determination of the manipulation information by the manipulation determining unit 54.

By this, it is possible to change the area set in the image according to the manipulation for the area.

In some embodiments, the image processing apparatus 1 further includes the image analyzing unit 57.

The image analyzing unit 57 detects a subject from the image acquired by the image acquiring unit 51.

The setting unit 52 sets the area in the image based on the position of the subject detected by the image analyzing unit 57.

By this, it is possible to detect a specific subject in a moving picture or the like and set an area so as to follow the subject.

Therefore, it is possible to sequentially display images following a specific subject included in a moving picture while correcting the images.

In some embodiments, the setting unit 52 changes the position and the size of the area based on the result of the detection of the image analyzing unit 57.

By this, it is possible to adjust the area according to the position and the size of the specific subject.

In some embodiments, the setting unit 52 store the result of the determination of the manipulation information by the manipulation determining unit 54 in correspondence with the information on the image acquired by the correction processing unit 56 in the image storage unit 71.

By this, it is possible to store images in the area as a moving picture corresponding to the manipulation.

In some embodiments, the setting unit 52 averages the result of the determination of the manipulation information by the manipulation determining unit 54 and stores the average in correspondence with the information on the image acquired by the correction processing unit 56 in the image storage unit 71.

By this, it is possible to store images in the area as a moving picture while alleviating deviations of the changes in the manipulation.

In some embodiments, the image generating unit 53 displays the image acquired by the image acquiring unit 51 together with the image in the area corrected by the correction processing unit 56.

By this, it is possible to display the original whole image before cutting and the image in the set area in a form which the viewer can easily visually recognize.

In some embodiments, the image acquired by the image acquiring unit 51 is a Raw format image.

By this, it is possible to properly correct the image in the area with a high degree of freedom.

In some embodiments, the setting unit 52 sets the shape of the area according to the user's manipulation.

By this, it is possible to sequentially display images while performing correction by using a variety of shapes of the area according to the shape of the subject or the user's intention.

In some embodiments, the correction processing unit 56 acquires image information relating to image areas near the area set by the setting unit 52 based on the weight of the image areas near the area placed to correspond to changes of the area changing continuously.

By this, in the case that the area continuously changes, it is possible to properly correct the image in the area by reflecting the weight of the image areas near the area corresponding to the changes.

In some embodiments, the correction processing unit 56 acquires image information relating to image areas near the area set by the setting unit 52 based on the weight of the image areas near the area placed to correspond to the direction of movement of the area.

By this, in the case that the area is moved, it is possible to properly correct the image in the area by reflecting an image in the direction of the movement.

In some embodiments, the image processing apparatus 1 includes the image acquiring unit 51, the setting unit 52, the correction processing unit 56, and the image generating unit 53.

The image acquiring unit 51 acquires an image.

The setting unit 52 sets an area (a trimming frame) in the image acquired by the image acquiring unit 51.

The setting unit 52 changes the area set in the image.

The correction processing unit 56 acquires image information in reference to at least one of the area at a time before the change by the setting unit 52 and the area at a time after the change by the setting unit 52.

The correction processing unit 56 corrects an image in at least one of the area before the change and the area after the change from the information of the image.

The image generating unit 53 controls the output unit 18 to sequentially display the images in the area before the change and the area after the change based on the result of the correction by the correction processing unit 56.

By this, in the case that the area set in the image changes, the image processing apparatus 1 performs correction of the image in one of the area before the change and the area after the change from the image information in at least one of the area before the change and the area after the change.

Therefore, it is possible to correct the image in the area so that the user does not feel a sense of incompatibility in the case of displaying images sequentially.

In addition, the present invention is not limited to the embodiments described above and various modifications and alternatives which can achieve the objects of the invention fall within the scope of the present invention.

For example, the present invention can be embodied by combining the functions of the image processing apparatus 1 described with respect to the embodiments and the modified examples.

Specifically, the functions of the image processing apparatus 1 of the first and the second embodiments can be combined. More specifically, in the case that the trimming frame is set to a position separated from the position before a change, it is possible to correct the image in the trimming frame after the change by using the image in the trimming frame before the change and images in the surrounding areas, and the image in the trimming frame after the change and images in the surrounding areas.

Further, the functions of the image processing apparatus 1 of the first and the third embodiments can be combined. More specifically, it is possible to correct the image in the trimming frame set surrounding the subject of interest by using the images in the trimming frame and its surrounding areas.

Further, the present invention can be configured by combining the functions of the image processing apparatus 1 of the second and the third embodiments.

By the combination of the functions, in the case that the trimming frame is set to a different separated position in frame images of a moving picture, it is possible to correct the image in the trimming after the change by using the image in the trimming frame before the change and the image in the trimming frame after the change.

Further, the present invention can be configured by combining the functions of the image processing apparatus 1 of the first to the third embodiments.

By the combination of the functions, in the case that the trimming frame is set to a different separated position in frame images of a moving picture, it is possible to correct the image in the trimming after the change by using the images in the trimming frame and its surrounding areas before the change and the images in the trimming frame and its surrounding areas after the change.

Further, it is also possible to combine the functions of each of the embodiments described above and the functions of the modified examples.

Further, in the case that the trimming frame changes in the embodiment described above, a position of an area in which the image information for correction processing is to be acquired can be determined from a positional relationship between the trimming frame before the change and the trimming frame after the change.

For example, the image information in an area in the middle of the trimming frame before the change and the trimming frame after the change can be acquired for the correction processing.

By this, it is possible to correct the image in the trimming frame by using the image information which is assumed to be a value having a predetermined relationship (for example, a median value) with the image information in the trimming frame before the change and the trimming frame after the change.

Further, in the case that the trimming frame changes in the embodiment described above, an area in a predetermined position separated from the position of one of the trimming frame before the change and the trimming frame after the change can be used as the area in which the image information for correction processing is to be acquired.

In other words, it is also possible to acquire the image information in an area of a predetermined position distantly separated from the position of one of the trimming frame before the change and the trimming frame after the change (for example, the center of the image, one of the four corners, a position separated in a specific direction by pixels of a predetermined number from the trimming frame, or the like) as well as the surrounding areas of the trimming frame as the information for the correction processing.

By this, it is possible to correct the image in the trimming frame by using the image information in a specific area separated from the trimming frame.

In the embodiments described above, the present invention has been applied to a digital camera as an example of the image processing apparatus 1 without limitation.

For example, the present invention can be applied to general electronic devices having the function of image trimming. More specifically, the present invention can be applied to a notebook type personal computer, a printer, a television, a video camera, a portable navigation device, a mobile phone, a smart phone, a portable game device, and the like.

Each of the process sequences described above can be executed by hardware or software.

In other words, the functional configuration shown in FIG. 2 is merely an example and the present invention is not limited thereto. The image processing apparatus 1 suffices if it has a function for performing the process sequence as a whole. Functional blocks to use to implement this function are not limited to the embodiment of FIG. 2.

In addition, a functional block may be configured by a piece of hardware, a piece of software, or their combination.

In the case that the sequence is performed by software, a program configuring the software is installed in a computer or the like from a network or a storage medium.

The computer may be a computer which is incorporated in dedicated hardware. In addition, the computer may be a computer capable of executing various functions by installing various programs therein, for example, a general-purpose personal computer.

A storage medium for recording such a program may include not only the removable media 31 shown in FIG. 1 which is distributed separately from the apparatus's main body to provide it to users, but also a storage medium or the like which is provided to users in a state of being incorporated in the apparatus's main body in advance.

The removable media 31 includes, for example, a magnetic disk (including a floppy disk), an optical disc, a magneto-optical disk, or the like.

For example, the optical disc includes a compact disk-read only memory (CD-ROM), a digital versatile disk (DVD), a Blu-ray (Registered Trademark) disc, or the like.

The magneto-optical disk includes a Mini-Disk (MD), or the like.

In addition, the storage medium which is provided to the users in a state of being incorporated in the apparatus's main body in advance includes, for example, the ROM 12 in FIG.

What is claimed is:

1. An image processing apparatus comprising:
a processor; and
a computer-readable medium in which a computer program product is stored,
the computer program product causes the processor to perform operations to:
acquire an image;
set an area in the image;
change the area set in the image;
acquire information on an image near at least one of the area before the change and the area after the change;
correct an image in at least one of the area before the change and the area after the change based on the acquired information; and
control a display unit to sequentially display the images in the area before the change and the area after the change based on the result of the correction.

2. The image processing apparatus of claim 1, wherein the operation to acquire information comprises acquiring information on the image in at least one of the area before the change and the area after the change.

3. The image processing apparatus of claim 1, wherein the operation to change the area comprises changing the position of the area set by the operation to set an area to a separated position.

4. The image processing apparatus of claim 1, wherein the operation to acquire information comprises acquiring information on an image in a predetermined position as the information on an image near the area based on a positional relationship of the area before the change and the area after the change.

5. The image processing apparatus of claim 4, wherein the predetermined position includes a position in the middle of the area before the change and the area after the change.

6. The image processing apparatus of claim 1, wherein the operation to acquire information comprises acquiring, based on position information of at least one of the area before the change and the area after the change, information on an image in a position separated from the position of the area as the information on an image near the area.

7. The image processing apparatus of claim 1, wherein the operation to acquire information comprises acquiring information on an image near one of the area before the change and the area after the change, and
the operation to correct an image comprises correcting the image in the other area based on the acquired information.

8. The image processing apparatus of claim 1, wherein the operation to acquire information comprises acquiring information on an image to be displayed next in the area set by the operation to set an area.

9. The image processing apparatus of claim 1, wherein the computer program product causes the processor to further perform operations to:
detect manipulation information; and
determine the manipulation information detected by the operation to detect manipulation information, and
the operation to set an area comprises setting the area in the image based on the result of the determination of the manipulation information by the operation to determine the manipulation information.

10. The image processing apparatus of claim 9, wherein the operation to change the area comprises changing the area in the image based on the result of the determination by the operation to determine the manipulation information.

11. The image processing apparatus of claim 9, wherein the computer program product causes the processor to further perform an operation to store the result of the determination by the operation to determine the manipulation information with the information on the image acquired by the operation to acquire information in a storage unit.

12. The image processing apparatus of claim 11, wherein the operation to store comprises averaging the result of the determination of the manipulation information by the operation to determine the manipulation information and storing the average with the information on the image acquired by the operation to acquire information in a storage unit.

13. The image processing apparatus of claim 1, wherein the computer program product causes the processor to further perform an operation to detect a subject in the image acquired by the operation to acquire an image, and
the operation to set an area comprises setting the area in the image based on the position of the subject detected by the operation to detect a subject.

14. The image processing apparatus of claim 13, wherein the operation to set an area comprises changing the position and the size of the area based on the result of the detection by the operation to detect a subject.

15. The image processing apparatus of claim 1, wherein the operation to control a display unit comprises controlling the display unit to display the image acquired by the operation to acquire an image together with the image in the area corrected by the operation to correct an image.

16. The image processing apparatus of claim 1, wherein the image acquired by the operation to acquire an image is a Raw format image.

17. The image processing apparatus of claim 1, wherein the operation to change the area comprises changing at least one selected from a group comprising the shape, the size, and the position of the area according to a user's manipulation.

18. The image processing apparatus of claim 1, wherein the operation to acquire information comprises acquiring image information relating to image areas near the area set by the operation to set an area based on weight of the image areas near the area placed so as to correspond to changes of the area changing continuously.

19. The image processing apparatus of claim 1, wherein the operation to acquire information comprises acquiring image information relating to image areas near the area set by the operation to set an area based on weight of the image areas near the area placed so as to correspond to the direction of movement of the area.

20. An image processing apparatus comprising:
a processor; and
a computer-readable medium in which a computer program product is stored,
the computer program product causes the processor to perform operations to:
acquire an image;
set an area in the image;
change the area set in the image;
acquire image information in reference to at least one of the area at a time before the change and the area at a time after the change;
correct an image in at least one of the area before the change and the area after the change based on the acquired image information; and
control a display unit to sequentially display the images in the area before the change and the area after the change based on the result of the correction.

21. An image processing method executed by an image processing apparatus comprising:
acquiring an image;
setting an area in the image;
changing the area set in the image;
acquiring information on an image near at least one of the area before the change and the area after the change;
correcting an image in at least one of the area before the change and the area after the change based on the acquired information; and
controlling a display unit to sequentially display the images in the area before the change and the area after the change based on the result of the correction.

22. An image processing method executed by an image processing apparatus comprising:
acquiring an image;
setting an area in the image;
changing the area set in the image;
acquiring image information in reference to at least one of the area at a time before the change and the area at a time after the change;
correcting an image in at least one of the area before the change and the area after the change based on the acquired image information; and
controlling a display unit to sequentially display the images in the area before the change and the area after the change based on the result of the correction.

23. A non-transitory computer-readable recording medium for recording a program readable by a computer, the program causing the computer to perform operations to:
acquire an image;
set an area in the image;
change the area set in the image;
acquire information on an image near at least one of the area before the change and the area after the change;
correct an image in at least one of the area before the change and the area after the change based on the acquired information; and
control a display unit to sequentially display the images in the area before the change and the area after the change based on the result of the correction.

24. A non-transitory computer-readable recording medium for recording a program readable by a computer, the program causing the computer to perform operations to:
acquire an image;
set an area in the image;
change the area set in the image;
acquire image information in reference to at least one of the area at a time before the change and the area at a time after the change;
correct an image in at least one of the area before the change and the area after the change based on the acquired image information; and
control a display unit to sequentially display the images in the area before the change and the area after the change based on the result of the correction.

* * * * *